United States Patent
Lim et al.

(10) Patent No.: US 6,952,321 B1
(45) Date of Patent: Oct. 4, 2005

(54) METHOD FOR SENSING RUN-OUT IN DATA FIELDS

(75) Inventors: EngHock Lim, Singapore (SG); BengTheam Ko, Singapore (SG); Jun Wang, Singapore (SG); MingYou Hu, Singapore (SG); Myint Ngwe, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 447 days.

(21) Appl. No.: 10/119,985

(22) Filed: Apr. 10, 2002

Related U.S. Application Data

(60) Provisional application No. 60/318,896, filed on Sep. 11, 2001.

(51) Int. Cl.$^7$ .......................... G11B 5/596; G11B 21/02
(52) U.S. Cl. ....................... 360/77.04; 360/75
(58) Field of Search .................... 360/77.04, 75, 360/31, 53

(56) References Cited

U.S. PATENT DOCUMENTS

| | | | |
|---|---|---|---|
| 5,859,742 A | 1/1999 | Takaishi | |
| 5,909,661 A | 6/1999 | Abramovitch et al. | |
| 5,949,602 A * | 9/1999 | Ishioka et al. | 360/75 |
| 6,606,214 B1 * | 8/2003 | Liu et al. | 360/77.02 |
| 6,714,367 B1 * | 3/2004 | Ishida et al. | 360/17 |

* cited by examiner

Primary Examiner—Andrew L. Sniezek
(74) Attorney, Agent, or Firm—Kirk A. Cesari

(57) ABSTRACT

A method of determining run-out in a disc drive involving steps of performing a direct current erase, selecting a reference track, writing a sinusoidal signal into a first track at a first offset from the reference track, sensing a read signal along the reference track, and analyzing the read signal to extract run-out information.

18 Claims, 6 Drawing Sheets

METHOD FOR SENSING RUN-OUT IN DATA FIELDS

CROSS REFERENCE TO RELATED APPLICATIONS

This application claims the benefit of U.S. Provisional Application No. 60/318,896, filed Sep. 11, 2001.

FIELD OF THE INVENTION

The present invention relates generally to disc drives, and more particularly, it relates to the field of servo technology.

BACKGROUND OF THE INVENTION

In the manufacture of disc drives, servo information is written onto discs to define tracks along which the read/write heads follow in drive operations. Despite the fact that servo information is written using a high precision servo track writer, the tracks rarely, if ever, turn out to be concentric circles. Variations in synchronism with the rotation of the spindle motor, commonly referred to as repeatable run-out (RRO), and variations not in synchronism with the rotation, referred to as non-repeatable run-out (NRRO), cause the servo track writer to write tracks which are not concentric circles. For convenience, RRO and NRRO will collectively be referred to as "run-out" in this document. The deviation of the actual written track from the ideal concentric circular track is referred to here as track deviation. Track deviations can be problematic because the write head may end up writing adjacent tracks that overlap. In addition, the read head may not follow the irregularly written track closely enough thereby resulting in what is referred to here as track misregistration. To allow for track deviations, tracks are generally written a certain minimum distance apart, which in turn means that achievable track density is limited.

Zero Acceleration Path (ZAP) techniques may be used to keep the read/write heads on track, and thus minimize track misregistrations. A track is typically divided into sectors, each of which serves as a unit of data storage. ZAP techniques involve writing data patterns in a ZAP field located at the beginning of a sector. The ZAP field and the servo gate contribute to the servo overhead, that is, the portion of the sector that is used for holding servo related information and which is not available for storage of user data. The rest of the sector that can be used for storing user data is referred to in this document as the data field. As the read head travels along a track, the ZAP field is read and calculations are made to estimate the run-out for the whole length of the sector. As technology advances to pack more information onto each disc, it is common to find a single ZAP field being used to estimate the track deviations for an extended stretch of the track. Such attempts to cut down the servo overhead and to free up more space for the data fields may result in compromising the accuracy of the read operations, particularly in cases where the run-out vary significantly along the stretch of the track between consecutive ZAP fields. For example, the ZAP field may be read for a duration of 2.7 microseconds ($\mu$s) and yet be used to estimate the run-out information for one or more data fields extending as much as 34.5 $\mu$s. If the run-out is more than 29 kilohertz, the resolution loss may well mean that the run-out effects are inadequately compensated for in the positioning of the read head and, as a result, the read head experiences unacceptable track misregistration.

It is expected that the run-out, with the associated problems, will have a greater impact on disc drive performance as the demand for higher format efficiency grows.

There is therefore a need to address the problems described above. The present invention proposes to meet this and other needs, and offers other advantages over the prior art.

SUMMARY OF THE INVENTION

Embodiments of the present invention involves a method of determining run-out in a disc drive, the method including steps of performing a direct current erase, selecting a reference track, writing a sinusoidal signal into a first track at a first offset from the reference track, sensing a read signal along the reference track, and analyzing the read signal to extract run-out information.

Embodiments of the present invention may include using the run-out information to determine track deviation, and to compensate for the track deviation to reduce track misregistration. Other embodiments may be implemented such that, if the run-out information is indicative of track deviation more severe than a predetermined level, the disc drive is rejected.

In some embodiments, there is provided a disc drive having at least one disc surface, at least one set of read/write heads, and an actuator supporting the read/write heads. In the disc drive, channel circuitry is configured to process read signals sensed by the set of read/write heads, and memory storage is available for carrying run-out information. The control circuitry is configured to control rotation of the actuator and thereby control positioning of the set of read/write heads relative to the disc surface. The positioning of the set of read/write heads takes into consideration compensation for track deviations based on the run-out information. The run-out information is at least in part, indirectly or directly, obtained from carrying out steps of performing a direct current erase, selecting a reference track, writing a sinusoidal signal into a first track at a first offset from the reference track, sensing a read signal along the reference track, analyzing the read signal to extract run-out information. The run-out information may be stored in memory storage, and the memory storage may not be located on the disc surface.

The analyzing step may further comprise a step of extracting the read signal before the read signal undergoes processing by channel circuitry of the disc drive. The analyzing step may further comprise steps of passing the read signal through an envelope extractor to obtain an envelope signal, and then passing the envelope signal through a low-pass filter to obtain a resultant signal indicative of the run-out information. Alternatively, the steps may further include a step, performed before the reading step, of writing a sinusoidal signal into a second track at a second offset from the reference track such that the first track and the second track are on either side of the reference track.

The present invention thereby provides a way of obtaining run-out information, and further enables a disc drive to be configured such that the run-out information so obtained can be used for determining track deviations, not only in the servo gate, but also in the data fields. Track misregistration can therefore be reduced as a result of having more accurate run-out information.

These and various other features as well as advantages which characterize the present invention will be apparent upon reading of the following detailed description and review of the associated drawings.

DETAILED DESCRIPTION

Figure 1:
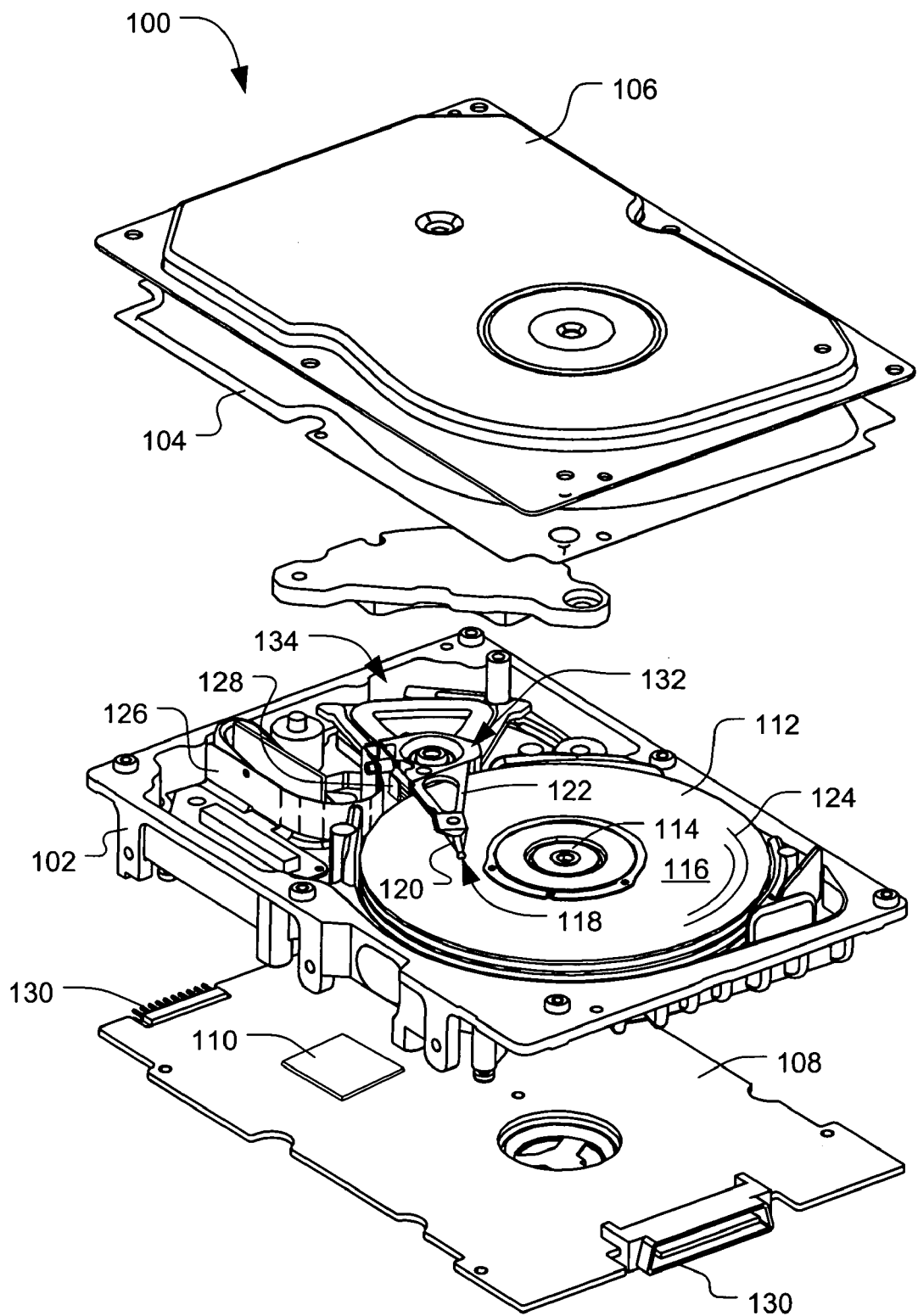
FIG. 1 shows an exploded perspective view of a disc drive.

Embodiments of the present invention are described below with reference to the drawings. A disc drive 100 as shown in FIG. 1 includes a baseplate 102 on which various components are mounted. A gasket 104 lies under a complementary cover 106 to provide a sealable enclosure with the baseplate 102. Attached to the baseplate 102 is a printed circuit board (PCB) 108 on which is located circuitry and devices (not particularly shown), including a channel chip 110, for controlling the operations of the disc drive 100.

At least one disc 112 is rotatably mounted on a spindle motor 114 that is securely fixed to the baseplate 102. Held out to at least one disc surface 116 of the one or more discs 112 is a set of read/write heads (collectively denoted by 118) supported at the extremities of one or more suspensions 120. Each suspension 120 is joined at the other end to an actuator arm 122. Each actuator arm 122 may be used to support two sets of read/write heads 118 configured to read/write data from/to tracks 124 on opposing adjacent disc surfaces 116. The read heads 118 are operably connected by a flex circuit 126, via a preamplifier 128, to the channel chip 110 and to other components on the PCB 108. Similarly, the write heads 118 are operably connected to the circuitry on the PCB 108. At least one connector 130 mounted to the PCB 108 provides for power and data connections to the disc drive 100. The position of the read/write head 118 is governed by an actuator 132 that supports the at least one actuator arm 122. The rotation of the actuator 132 is in turn controlled by a voice coil motor 134.

Figure 2:
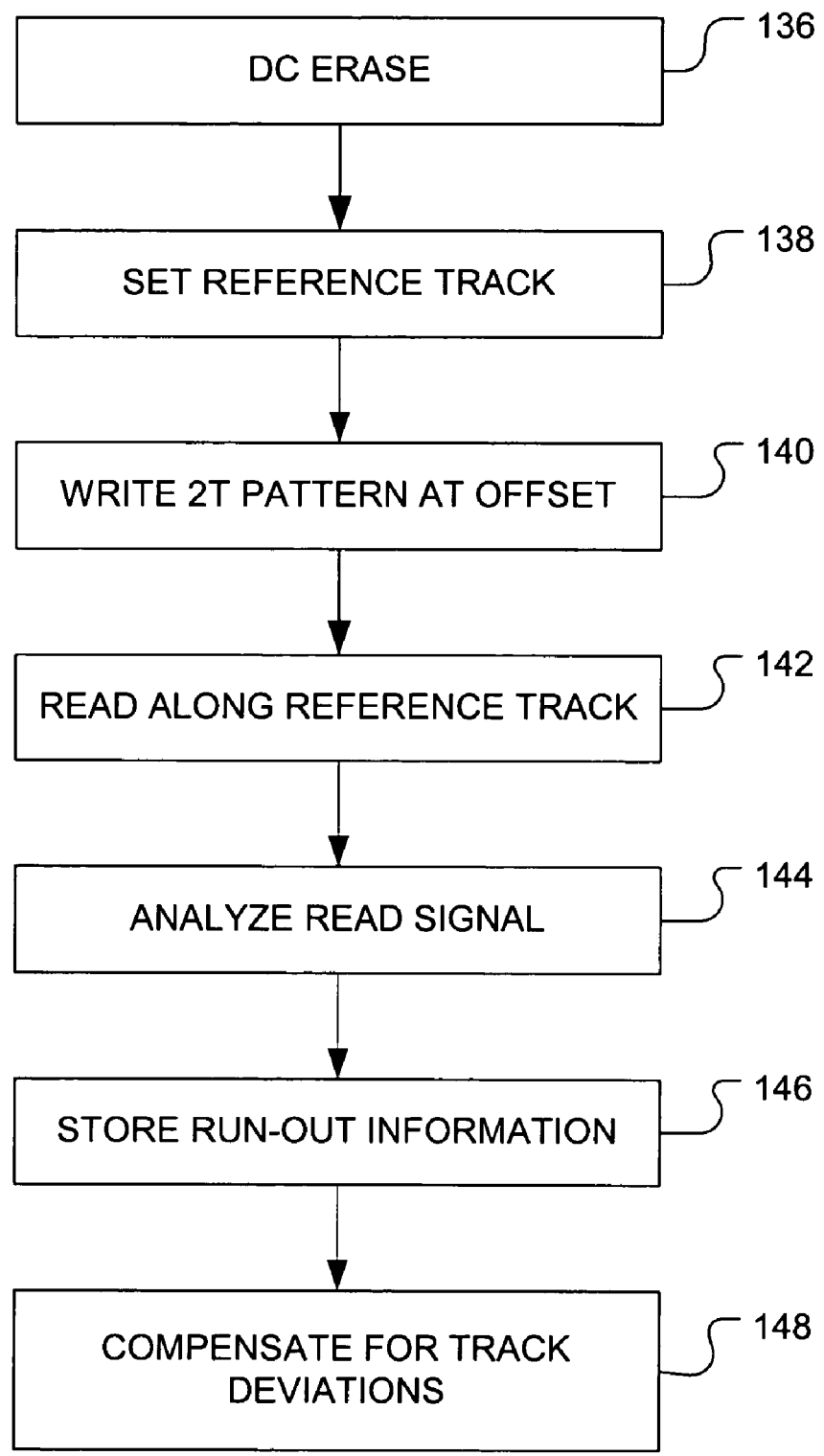
FIG. 2 is a flow chart illustrating one embodiment of the present invention.

Referring now to FIG. 2, using a servo track writer, a direct current (DC) pattern is written over a disc surface 116 (FIG. 1) of the disc drive 100 (FIG. 1) in step 136. This may be referred to as a DC erase process. The DC erase may take place over only a portion of the disc surface 116 (FIG. 1). Within the erased region, a reference track is chosen at 138. At a chosen offset to the reference track, a first track is written with what is commonly referred to in the industry as a 2T sinusoidal pattern 140. The read head 118 (FIG. 1) is then made to travel over the reference track to sense a read signal 142. The read signal will include run-out information in the form of the sinusoidal signal coupled to the signal sensed by the read head 118 (FIG. 1). The more off-track is the read head 118 (FIG. 1) from the reference track, that is the greater the track misregistration, the larger is the sinusoidal signal coupled into the read signal. From the read signal, the direction of the track misregistration can also be determined in addition to a measure of its magnitude. The run-out information thus determined 144 can be stored 146 in the disc drive for use in compensating for track deviations 148. Alternatively, the run-out information may serve as an indicator of the quality of the disc drive 100. Disc drives that exhibit severe track deviation behavior may, through application of the present invention, be identified and rejected.

Figure 3:
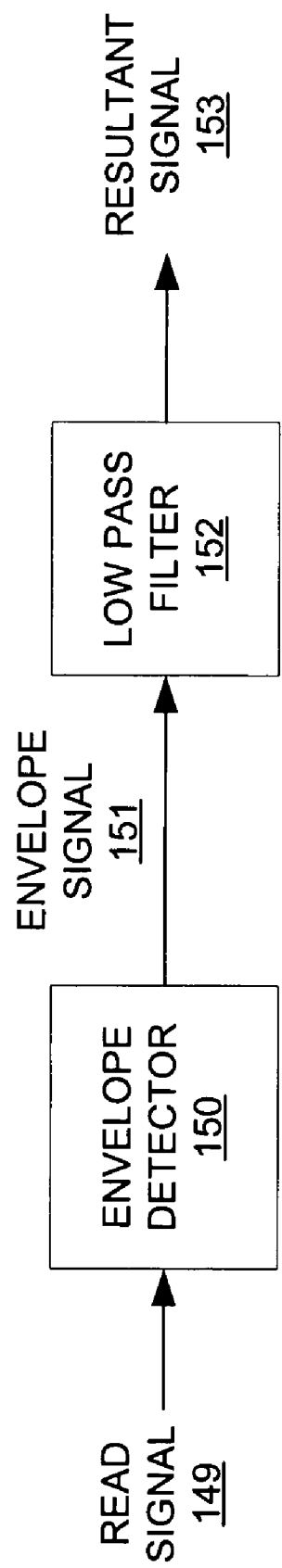
FIG. 3 is a schematic block diagram showing steps of analysis applied to a read signal, according to one embodiment of the present invention.

The analysis 144 may be carried out using the read signal that is measured right after the preamplifier 128, before it goes into the channel chip 110. As shown in FIG. 3, the read signal 149 may be passed through an envelope detector 150 to obtain an envelope signal 151. The envelope signal 151 may then be passed through a low pass filter 152 to extract a resultant signal 153 that is indicative of the sought-after run-out information.

In other embodiments, the read signal 149 from the read head 118 may be extracted at another location before it is passed through the envelope detector 150 and subsequently through the low pass filter 152. Examples of other possible locations may include a location before the channel chip 110, or perhaps incorporated at the analog front-end stage of the channel chip 110.

Alternatively, embodiments of the present invention may be described with reference to FIGS. 4 and 5. A DC pattern is written 154 for a reference track, 162 and for a width allowing for at least one track on either side of the reference track 162. A 2T pattern is written 156 for a first track 164 on one side of the reference track 162. The first track 164 is written at a chosen first offset 166 from the reference track 162. The first offset 166 may be half the width of the reference track 162, or it may be more or less than half the width of the reference track 162. A 2T pattern is written 158 for a second track 168 on the other side of the reference track 162 at a chosen second offset 170 from the reference track 162. The second offset 170 may be half the width of the reference track 162, or it may be more or less than half the width of the reference track 162. The first offset 166 may be the same magnitude as the second offset 170, or the two offsets 166, 170, may be chosen to be of different magnitudes. The read head 118 is made to travel along the reference track 162 to sense a read signal 160. Run-out information is extracted 161 from the read signal. Preferably, this is done by taking the read signal 149 after it passes through the preamplifier 128 but before it enters the channel chip 110. Also referring to FIG. 3, the read signal 149 is passed through an envelope detector 150 to provide an envelope signal 151 which is in turn passed through a low pass filter 152 to give a resultant signal 153.

The resultant signal 153 indicates the extent to which the 2T pattern written along the first track 164 and the second track 168 has been coupled into the read signal 149 as a result of the read head 118 moving off-track from the reference track 162. This is further described with reference to FIG. 5 which shows a schematic diagram of a short length of the reference track 162 flanked on either side by a first track 164 and a second track 168. For purposes of illustration, the reference track 162 has been drawn as a straight line. The first track 164, with 2T pattern written along it, is shown as a wavy path to illustrate departures from an ideal concentric circular path resulting from the influence of run-out in the system. Similarly for the second track 168, it is shown as a wavy path to illustrate the influence of run-out in the system as the write head 118 writes out the 2T pattern. The path 172 of the read head 118 is shown. Although it is intended for the read head 118 to travel along the reference track 162, the read head 118 may deviate from the actual reference track 162. When the read head 118 suffers track misregistration, it will pick up the 2T pattern written on the first track 164 or the second track 168. The greater the extent of track misregistration, the more of the 2T pattern will be picked up by the read head 118. The read signal 149 is therefore coupled with the 2T sinusoidal signal.

Figure 6:
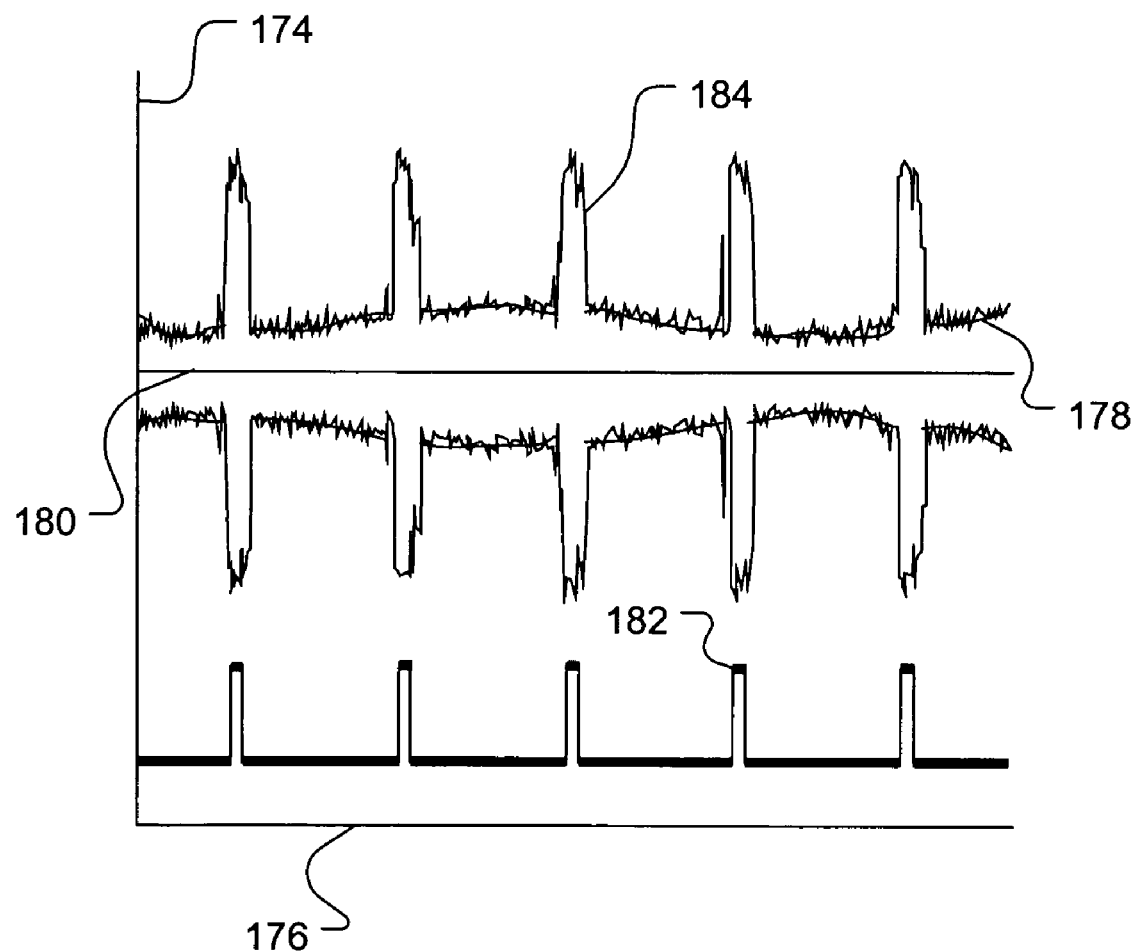
FIG. 6 shows a plot of signal amplitude against time for an application of an embodiment of the present invention.

Looking back to FIG. 3, the read signal 149 may be analyzed by passing it through an envelope detector 150 to obtain an envelope signal 151. The envelope signal 151 is then passed through a low pass filter 152 to remove the high-frequency signal to give a resultant signal 153. The profile of the resultant signal 153 may be shown in a plot of signal amplitude 174 versus time 176 as shown in FIG. 6. Generally, the greater the track misregistration, the larger will be the amplitude of resultant signal, with reference to the baseline 180. Where the first offset 166 and the second offset 170 are chosen to be of the same distance, the resultant signal 153 should be relatively small or negligibly small when the read head 118 is at the center of the reference track 162. In FIG. 6, the presence of servogate 182 on the disc surface 116 accounts for the periodic jumps in the read signal plot 184. Comparing the servogate plot with the resultant signal, it can be clearly seen that the present invention can be applied to provide run-out information along the whole track, and is not limited to a small sampling at the overhead or ZAP field.

Figure 4:
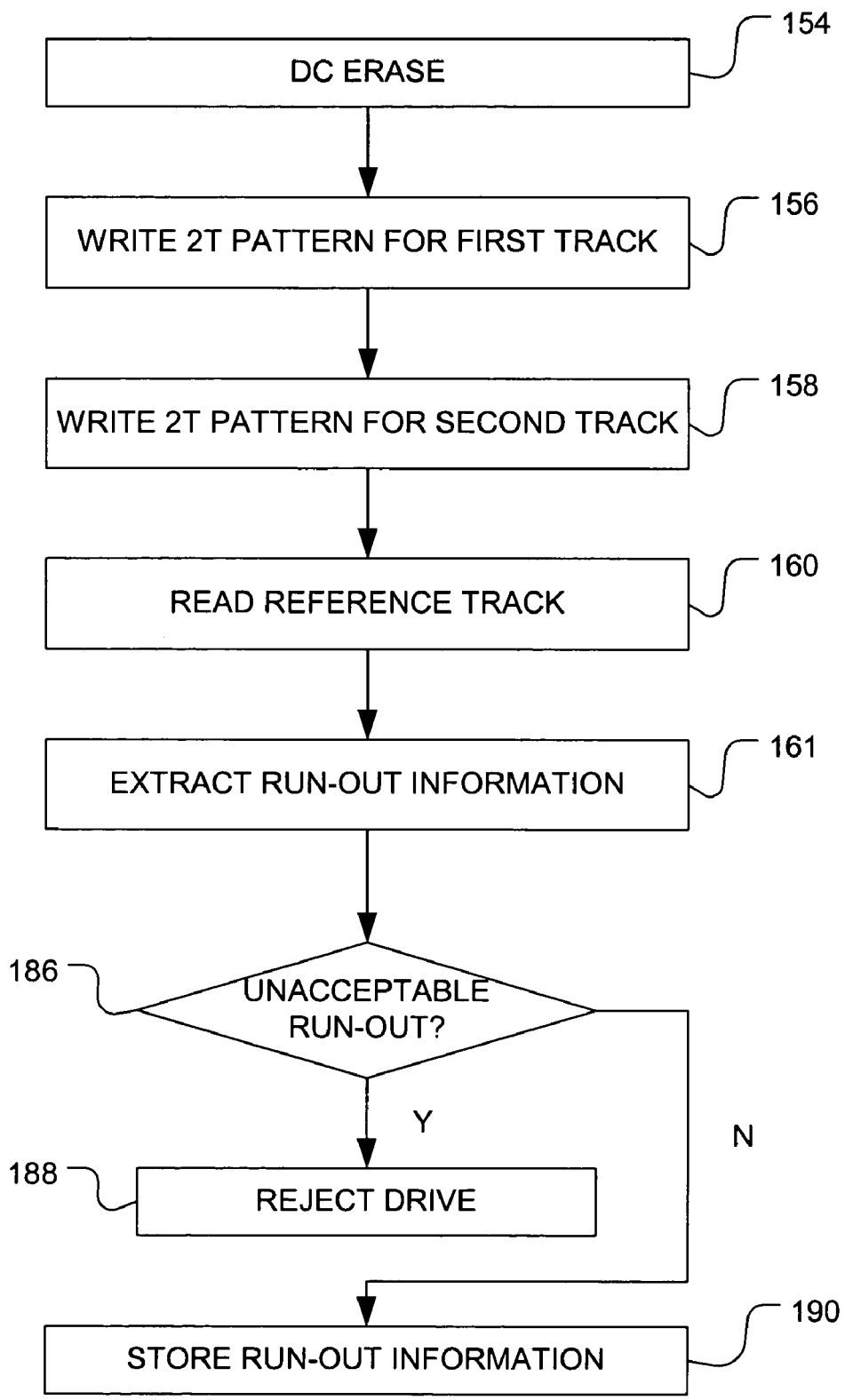
FIG. 4 is a flow chart illustrating another embodiment of the present invention.
Figure 5:
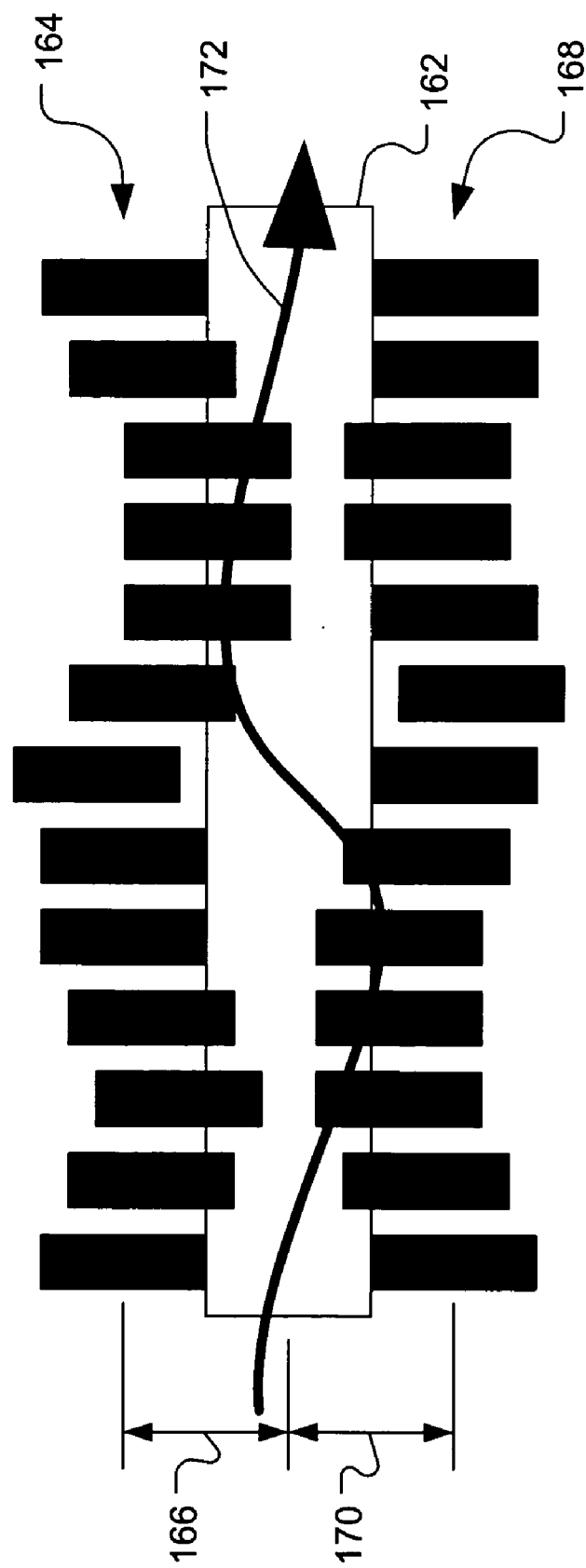
FIG. 5 is a schematic diagram of a portion of a few tracks according to one embodiment of the present invention.

Continuing with the description of the embodiment of FIG. 4, having determined the overall influence of the run-out, the embodiment may include a testing procedure 186 for the manufacture of disc drives. As an illustration, one such test may involve sensing the run-out for disc drives and rejecting 188 disc drives that exhibit unacceptable levels of run-out. Alternatively, run-out information for the track may be stored 190 in a memory in the disc drive, and used in calculating the required compensation for keeping the read head on track for future disc drive operations. Preferably, the run-out information that is collected may be stored in dynamic random access memory (DRAM) so that it can be accessed and used, using methods known in the industry, for compensating the run-out in future read operations.

The present invention provides for the sensing of the run-out throughout the length of the track, a capability previously not known with conventional techniques such as the ZAP techniques. Even in the case where the length of each data field is extended or where more than one data fieldshares a single servo field, the disc drive can have sufficient run-out information to keep the read head fairly on track and thus give better disc drive performance. There can thus be less reliance on the conventional method where the run-out data collected along 8 percent of a track is used to estimate the required compensation for track deviation for the other 92 percent of the track.

With the more detailed information on the run-out sensed using the present invention, and with the storage of the run-out information being stored away from the disc, the ZAP field may be made redundant for use in compensating the run-out effects. As a result, less servo overhead needs to be provided for, and more space may be made available for user data.

Additionally, the present invention may be applied as a way of evaluating on-track servo performance.

The present invention also makes it possible to extract additional information on the run-out for any point along the whole length of the track. For example, the envelope profile that is obtained for the run-out may be further analyzed by applying the Fourier Transform such that the magnitudes and frequencies of the component waveforms can be extracted.

Alternatively described, embodiments of the present invention involves a method of determining run-out in a disc drive 100, the method including steps of performing 136 a direct current erase, selecting 138 a reference track 162, writing 140 a sinusoidal signal into a first track 164 at a first offset 166 from the reference track 162, sensing 142 a read signal 149 along the reference track 162, and analyzing the read signal 144 to extract run-out information.

Embodiments of the present invention may include using the run-out information to determine track deviation, and to compensate for the track deviation to reduce track misregistration 148. Other embodiments may be implemented such that, if the run-out information is indicative of track deviation more severe than a predetermined level, the disc drive is rejected 186, 188.

In some embodiments, there is provided a disc drive 100 having at least one disc surface 116, at least one set of read/write heads 118, and an actuator 132 supporting the read/write heads 118. In the disc drive 100, channel circuitry 110 is configured to process read signals 186 sensed by the set of read/write heads 118, and memory storage (as found on PCB 108) is available for carrying run-out information. The control circuitry (as found on PCB 108) is configured to control rotation of the actuator 132 and thereby control positioning of the set of read/write heads 118 relative to the disc surface 116. The positioning of the set of read/write heads 118 takes into consideration compensation for track deviations based on the run-out information. The run-out information is at least in part, indirectly or directly, obtained from carrying out steps of performing 136 a direct current erase, selecting 138 a reference track 162, writing 140 a sinusoidal signal into a first track 164 at a first offset 166 from the reference track 162, sensing a read signal 149 along the reference track 162, analyzing the read signal 149 to extract run-out information. The run-out information may be stored in memory storage, and the memory storage may not be located on the disc surface 116.

The analyzing step may further comprise a step of extracting the read signal 149 before it undergoes processing by channel circuitry 110 of the disc drive 100. The analyzing step may further comprise steps of passing the read signal 149 through an envelope detector 150 to obtain an envelope signal 151. The analysis may further include passing the envelope signal 151 through a low-pass filter 152 to obtain a resultant signal 153 indicative of the run-out information. Alternatively, the steps may further include a step 158, performed before the reading step 160, of writing a sinusoidal signal into a second track 168 at a second offset 170 from the reference track 162 such that the first track 164 and the second track 168 are on either side of the reference track 162.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the signal patterns that are used for writing the first track, and/or the second track, may vary depending on the particular disc drive configuration while maintaining substantially the same functionality without departing from the scope of the present invention. In addition, although the present invention has be described with reference to an improved method of sensing Run-out, it can also be used to assess slider flyability, without departing from the scope and spirit of the present invention. For example, from the read signal, the fly height may be estimated based on the rule that the greater the fly height, the lower the sinusoidal signal coupled, and that the lower the fly height, the greater the sinusoidal signal coupled.

What is claimed is:

1. A method of determining run-out in a disc drive, the method comprising steps of:
    (a) performing a direct current erase;
    (b) selecting a reference track;
    (c) writing a sinusoidal signal into a first track at a first offset from the reference track;
    (d) sensing a read signal along the reference track; and
    (e) analyzing the read signal to extract run-out information.

2. The method of claim 1 wherein the analyzing step (e) further comprises a step of extracting the read signal before the read signal undergoes processing by channel circuitry of the disc drive.

3. The method of claim 1 wherein the analyzing step (e) further comprises steps of
    passing the read signal through an envelope detector to obtain an envelope signal; and
    passing the envelope signal through a low-pass filter to obtain a resultant signal indicative of the run-out information.

4. The method of claim 3 further comprising a step of storing the run-out information.

5. The method of claim 3 further comprising steps of:
    using the run-out information to determine track deviation; and
    compensating for the track deviation to reduce track misregistration.

6. The method of claim 3 further comprising a step of, if the run-out information is indicative of track deviation more severe than a predetermined level, rejecting the disc drive.

7. The method of claim 1 further comprising a step (f) before reading step (d) step of writing a sinusoidal signal into a second track at a second offset from the reference track, wherein the first track and the second track are on opposing sides of the reference track.

8. The method of claim 7 wherein the analyzing step (e) further comprises a step of extracting the read signal before the read signal undergoes processing by channel circuitry of the disc drive.

9. The method of claim 7 wherein the analyzing step (e) further comprises steps of
    passing the read signal through an envelope detector to obtain an envelope signal; and
    passing the envelope signal through a low-pass filter to obtain a resultant signal indicative of the run-out information.

10. The method of claim 9 further comprising a step of storing the run-out information.

11. The method of claim 9 further comprising steps of:
    using the run-out information to determine track deviation; and
    compensating for the track deviation to reduce track misregistration.

12. The method of claim 9 further comprising a step of, if the run-out information is indicative of track deviation more severe than a predetermined level, rejecting the disc drive.

13. A disc drive comprising:
    at least one disc surface;
    at least one set of read/write heads;
    an actuator supporting the read/write heads;
    channel circuitry configured to process read signals sensed by the set of read/write heads;
    memory storage carrying run-out information, the memory storage being not on the disc surface; and
    control circuitry configured to control rotation of the actuator and;
    thereby control positioning of the set of read/write heads relative to the disc surface, the positioning of the set of read/write heads being compensated for track deviations based on the run-out information, wherein the run-out information is at least in part, indirectly or directly, obtained from carrying out steps of:
        (a) performing a direct current erase;
        (b) selecting a reference track;
        (c) writing a sinusoidal signal into a first track at a first offset from the reference track;
        (d) sensing a read signal along the reference track;
        (e) analyzing the read signal to extract run-out information; and
        (f) storing the run-out information in the memory storage.

14. The disc drive of claim 13 wherein the analyzing step (e) further comprises a step of extracting the read signal before the read signal undergoes processing by the channel circuitry of the disc drive.

15. The disc drive of claim 13 wherein the analyzing step (e) further comprises steps of:
    passing the read signal through an envelope detector to obtain an envelope signal; and
    passing the envelope signal through a low-pass filter to obtain a resultant signal indicative of the run-out information.

16. The disc drive of claim 13 wherein the steps further include a step (f) before reading step (d) step of writing a sinusoidal signal into a second track at a second offset from the reference track, wherein the first track and the second track are on either side of the reference track.

17. The disc drive of claim 16 wherein the analyzing step (e) further comprises a step of extracting the read signal before the read signal undergoes processing by the channel circuitry of the disc drive.

18. The disc drive of claim 16 wherein the analyzing step (e) further comprises steps of:
    passing the read signal through an envelope detector to obtain an envelope signal; and
    passing the envelope signal through a low-pass filter to obtain a resultant signal indicative of the run-out information.

* * * * *